Nov. 13, 1923. 1,473,957
C. C. HUSTON
TRACTION DEVICE FOR VEHICLE WHEELS
Filed June 7, 1922
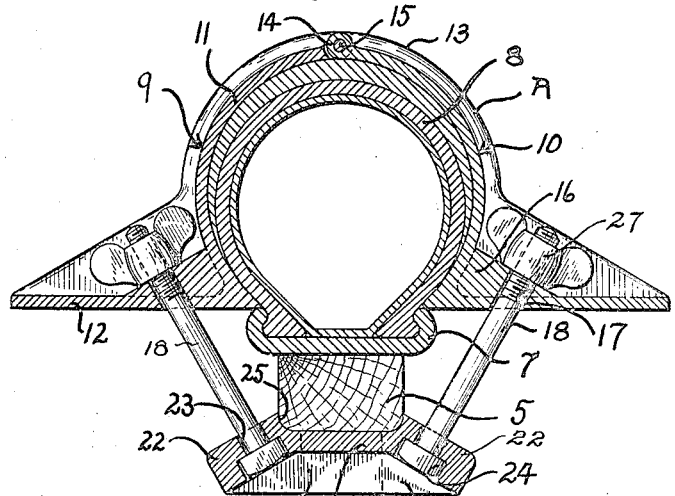
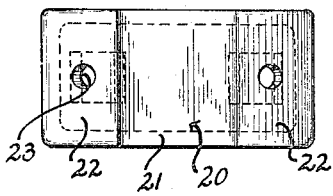
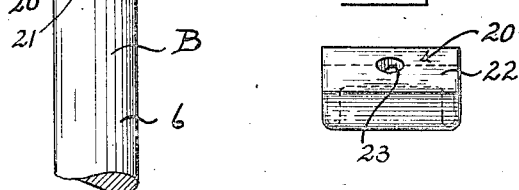
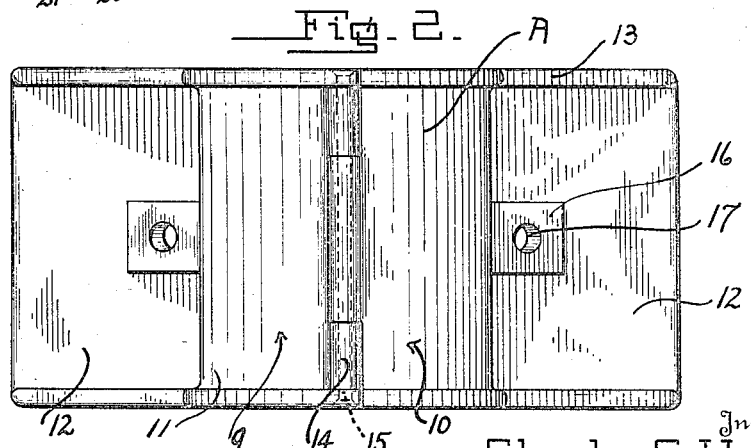
Inventor
Charles C. Huston
By Lancaster and Allwine
Attorneys Patented Nov. 13, 1923.

1,473,957

UNITED STATES PATENT OFFICE.

CHARLES C. HUSTON, OF DAYTON, OHIO.

TRACTION DEVICE FOR VEHICLE WHEELS.

Application filed June 7, 1922. Serial No. 566,548.

*To all whom it may concern:*

Be it known that I, CHARLES C. HUSTON, a citizen of the United States, residing at Dayton, in the county of Montgomery and State of Ohio, have invented certain new and useful Improvements in Traction Devices for Vehicle Wheels, of which the following is a specification.

This invention relates to motor vehicle attachments, and the primary object of the invention is to provide novel means for connection with the vehicle wheels for insuring proper traction between the vehicle wheels and the roadway.

Another object of the invention is to provide a novel mud shoe for detachable connection with vehicle wheels, which can be quickly and easily applied to a wheel and facilitate a grip being obtained by the wheel to permit the automobile to ride out of mud holes and the like.

A further object of the invention is to provide a novel means for associating the mud shoe with the vehicle tire and wheel, whereby the shoe will rest upon or abut against the vehicle rim so that a part of the pressure coming upon the shoe will be transmitted to the rim, and thus prevent injury to the tire when the tire is not fully inflated.

A further object of the invention is the provision of means for connecting the mud shoe in place, so that the said shoe can be applied to the tire and wheel from the running board of the automobile, thereby eliminating the necessity of the occupants of the vehicle getting out of the machine to apply the said shoe.

A still further object of the invention is to provide a novel mud shoe for motor vehicles of the above character, which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings;

Figure 1 is a fragmentary section through an automobile wheel, showing the improved mud shoe attached thereto, the shoe being also shown in section.

Figure 2 is a plan view of the improved shoe removed from the vehicle wheel.

Figure 3 is a detail plan view of the clamp member for the shoe.

Figure 4 is an end elevation of the clamp.

Referring to the drawings in detail, wherein similar reference characters designate corresponding parts throughout the several views, the letter A generally indicates the improved mud shoe; and B, a vehicle wheel with which the same is associated.

The wheel B is of the usual or any preferred type, and as shown includes the felly 5 and the spoke 6. The felly 5 supports any preferred type of rim 7 for the tire 8.

The improved shoe A includes the companion body members 9 and 10, each of which includes the substantially semi-circular tire engaging portion 11 and the outwardly extending flanges or flat bearing plates 12. The flanges 12 are adapted to extend outwardly of the rim 7 in substantially parallel relation to the inner and outer faces thereof. The side edges of the semi-circular portions 11 and the outwardly extending flat plates 12 can be reinforced by beads 13, which also constitute road gripping flanges. The companion sections or body portions 9 and 10 have their inner ends disposed substantially at the circumferential center of the tire and are provided with companion hinge barrels 14, which receive a pivot pin 15. Each of the sections or body portions 9 and 10 at the juncture of the arcuate portions 11 and the outwardly extending plates 12 are provided with integral lugs 16. These lugs are disposed substantially intermediate the side flanges or ribs 13, and are provided with inwardly extending inclined openings 17, through which are adapted to extend the retaining bolts 18. A retaining member 20 is provided for the mud shoe and includes the body portion 21 and the oppositely disposed inclined ears 22, which are provided with openings 23. These openings 23 are in alignment with the openings 17 formed in the lugs 16, and the bolts 18 are also adapted to extend through the said openings 23.

If desired, the inner faces of the ears 22 can be provided with countersinks 24 for the reception of the heads of the bolts 18. It is preferred that the ears 22 extend slightly above the intermediate body portion 21 so as to form shoulders 25 for engaging the opposite side faces of the felly 5, it being understood that the body portion 21 of the retaining member 20 engages the inner face of the felly 5. Webs 26 may be provided for the retaining member, which may extend from one lug 22 to the other. The outer free ends of the bolts 18 are threaded and are adapted to receive wing nuts 27, which are adapted to be threaded into tight engagement with the lugs 16. It can be seen that by tightening the nuts 27, the body portions or companion sections 9 and 10 can be brought into tight engagement with the tire and rim 7 and accidental movement thereof prevented. The nuts 27 can be of the lock nut type if so desired.

In applying the improved mud shoe to a vehicle wheel, the occupant of the vehicle may stand upon the running board and spread the sections 9 and 10 and then slip the same over the tire, after which the sections are moved into intimate contact with the tire and abutting against the flanges of the rim 7. The retaining member 20 is then placed on the felly and the bolts 18 passed through the registering openings 23 and 17. The nuts 27 can then be threaded upon the shanks of the bolts 18 in order to firmly bind the shoe in position.

The shape of the shoe is such that the same will form an efficient means for gripping the road way so as to facilitate the riding of the vehicle from out of the mud hole or the like. It is obvious that the shoe will prevent the wheels from spinning around in the mud without obtaining a grip thereon.

Changes in details may be made without departing from the spirit or scope of this invention; but,

I claim:

1. The combination with a vehicle wheel including a felly, a tire rim fitted upon the felly, and a tire supported by said rim, of a traction device including a pair of companion sections, means pivotally connecting said sections together, each of said sections including arcuate body portions and outwardly extending bearing plates, the sections at the point of juncture of the arcuate tire engaging portions and the outwardly extending bearing plates engaging said rim, a retaining member engaging the felly and including oppositely extending inclined ears, bolts extending through the ears and the bearing plates, and winged nuts fitted upon said bolts and arranged to engage said bearing plates.

2. In a traction device for vehicle wheels, a pair of companion sections each including arcuate tire engaging body portions and outwardly extending flat bearing plates, the opposite edges of the sections being provided with flanges, means pivotally connecting the sections together, bearing lugs formed on the sections at the point of juncture of the arcuate tire engaging body portions and the outwardly extending plates, said bearing lugs being provided with oppositely directed inwardly extending openings, a felly engaging retaining member including a body portion, and laterally extending oppositely inclined apertured ears, bolts extending through the apertures in the ears and the openings in the lugs, and nuts fitted upon said bolts arranged to engage said lugs.

CHARLES C. HUSTON.